(12) United States Patent
Nakakura

(10) Patent No.: US 12,231,781 B2
(45) Date of Patent: Feb. 18, 2025

(54) REMOTE CONTROL SYSTEM, AND REMOTE OPERATION APPARATUS, VIDEO IMAGE PROCESSING APPARATUS, AND COMPUTER-READABLE MEDIUM

(71) Applicant: NTT Communications Corporation, Tokyo (JP)

(72) Inventor: Toshiya Nakakura, Tokyo (JP)

(73) Assignee: NTT Communications Corporation, Tokyo (JP)

( * ) Notice: Subject to any disclaimer, the term of this patent is extended or adjusted under 35 U.S.C. 154(b) by 88 days.

(21) Appl. No.: 18/054,242

(22) Filed: Nov. 10, 2022

(65) Prior Publication Data

US 2023/0076335 A1 Mar. 9, 2023

Related U.S. Application Data

(63) Continuation of application No. PCT/JP2021/018476, filed on May 14, 2021.

(30) Foreign Application Priority Data

May 14, 2020 (JP) ................................ 2020-085315

(51) Int. Cl.
*H04N 23/80* (2023.01)
*G06F 3/01* (2006.01)
*H04N 7/18* (2006.01)

(52) U.S. Cl.
CPC ............. *H04N 23/80* (2023.01); *G06F 3/012* (2013.01); *H04N 7/183* (2013.01)

(58) Field of Classification Search
None
See application file for complete search history.

(56) References Cited

U.S. PATENT DOCUMENTS 10,969,591 B2 4/2021 Nakamura
2005/0267826 A1* 12/2005 Levy ...................... G06Q 30/04
348/E7.078
(Continued)

FOREIGN PATENT DOCUMENTS

JP 05-228855 A 9/1993
JP 2002-135641 A 5/2002
(Continued)

OTHER PUBLICATIONS

Extended European Search Report issued Oct. 10, 2023 in European Application No. 21805315.5, 11 pages.
(Continued)

*Primary Examiner* — Talha M Nawaz
(74) *Attorney, Agent, or Firm* — Oblon, McClelland, Maier & Neustadt, L.L.P.

(57) ABSTRACT

A remote operation apparatus is configured to operate in response to a control signal transmitted via a network from a user apparatus connected to a display unit and includes a movable unit capable of changing a posture. The remote operation apparatus includes: a video data acquisition unit configured to acquire video data acquired from a camera disposed in the movable unit; a motion detection data acquisition unit configured to acquire, through a motion sensor, motion detection data representing a change in the posture of the movable unit; and a data transmission unit configured to transmit the acquired video data and the acquired motion detection data to the user apparatus via the network.

5 Claims, 7 Drawing Sheets

(56) References Cited

U.S. PATENT DOCUMENTS

| | | | | |
|---|---|---|---|---|
| 2011/0248837 | A1* | 10/2011 | Israr | .................. G06F 3/016 |
| | | | | 340/407.1 |
| 2016/0228771 | A1 | 8/2016 | Watson | |
| 2017/0285694 | A1* | 10/2017 | Kim | .................. G06F 1/1694 |
| 2018/0078034 | A1* | 3/2018 | Savall | .................. A47B 21/03 |
| 2018/0194004 | A1* | 7/2018 | Fukuda | .................. B25J 9/1612 |
| 2018/0296921 | A1 | 10/2018 | Watson | |
| 2018/0338132 | A1* | 11/2018 | Rao Padebettu | .... H04N 13/344 |
| 2019/0385376 | A1* | 12/2019 | Kim | .................. G06F 3/0482 |
| 2020/0055195 | A1* | 2/2020 | Ignakov | .................. B25J 13/06 |
| 2020/0319463 | A1 | 10/2020 | Nakamura | |
| 2021/0084429 | A1* | 3/2021 | Tajik | .................. G06F 3/011 |
| 2021/0192805 | A1 | 6/2021 | Nakakura | |

FOREIGN PATENT DOCUMENTS

| | | | |
|---|---|---|---|
| JP | 2017-201742 | A | 11/2017 |
| JP | 2019-106628 | A | 6/2019 |
| JP | 6655751 | B1 | 2/2020 |
| WO | WO 2019/176035 | A1 | 9/2019 |

OTHER PUBLICATIONS

International Preliminary Report on Patentability and Written Opinion issued Nov. 24, 2022, in PCT/JP2021/018476, 6 pages.
International Search Report issued Aug. 3, 2021 in PCT/JP2021/018476 filed on May 14, 2021, 6 pages (with English Translation).

* cited by examiner

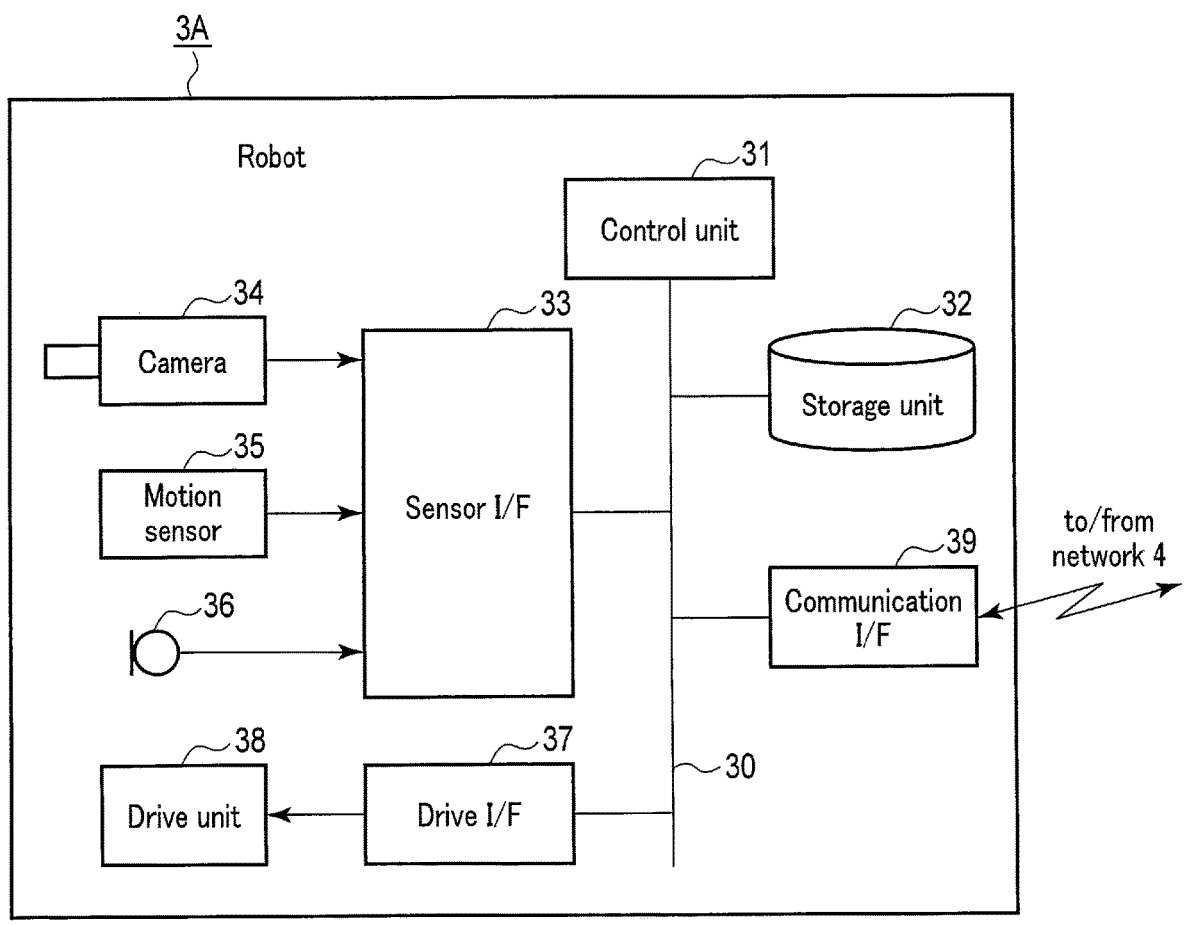
F I G. 2

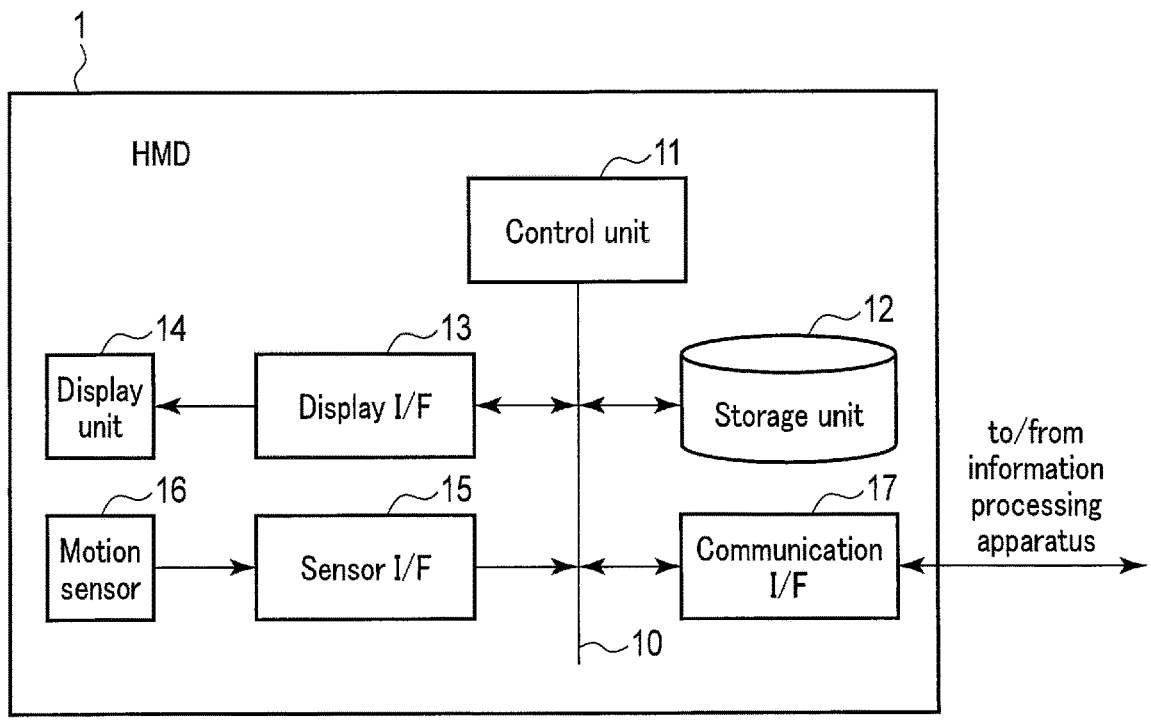
F I G. 3
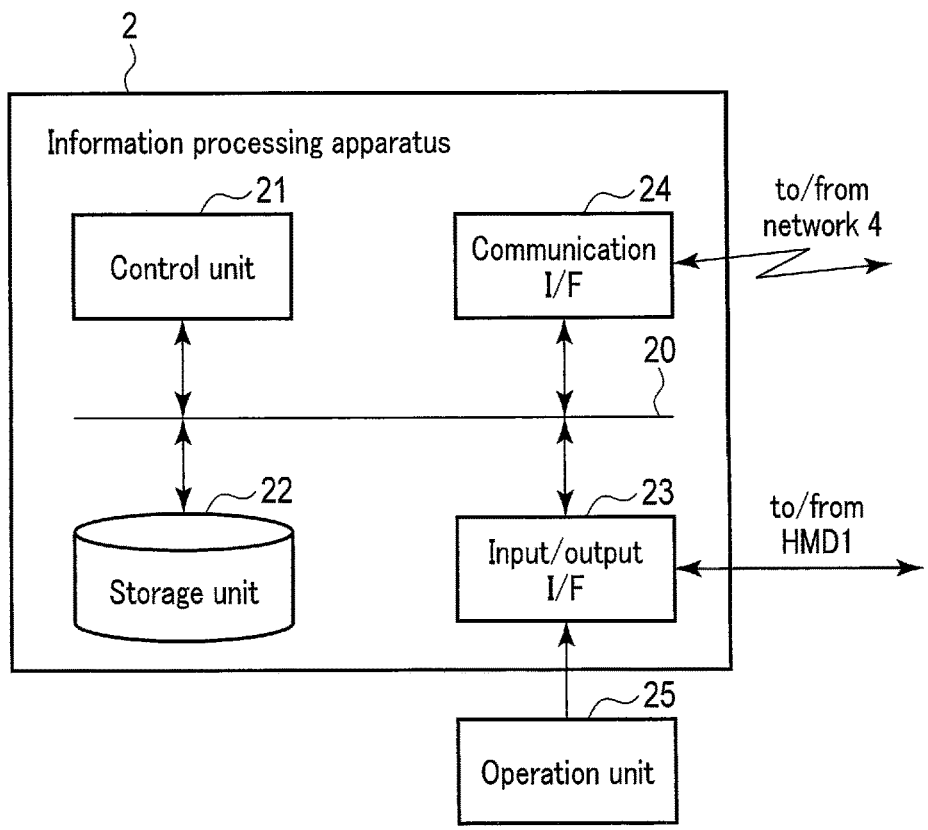
F I G. 4

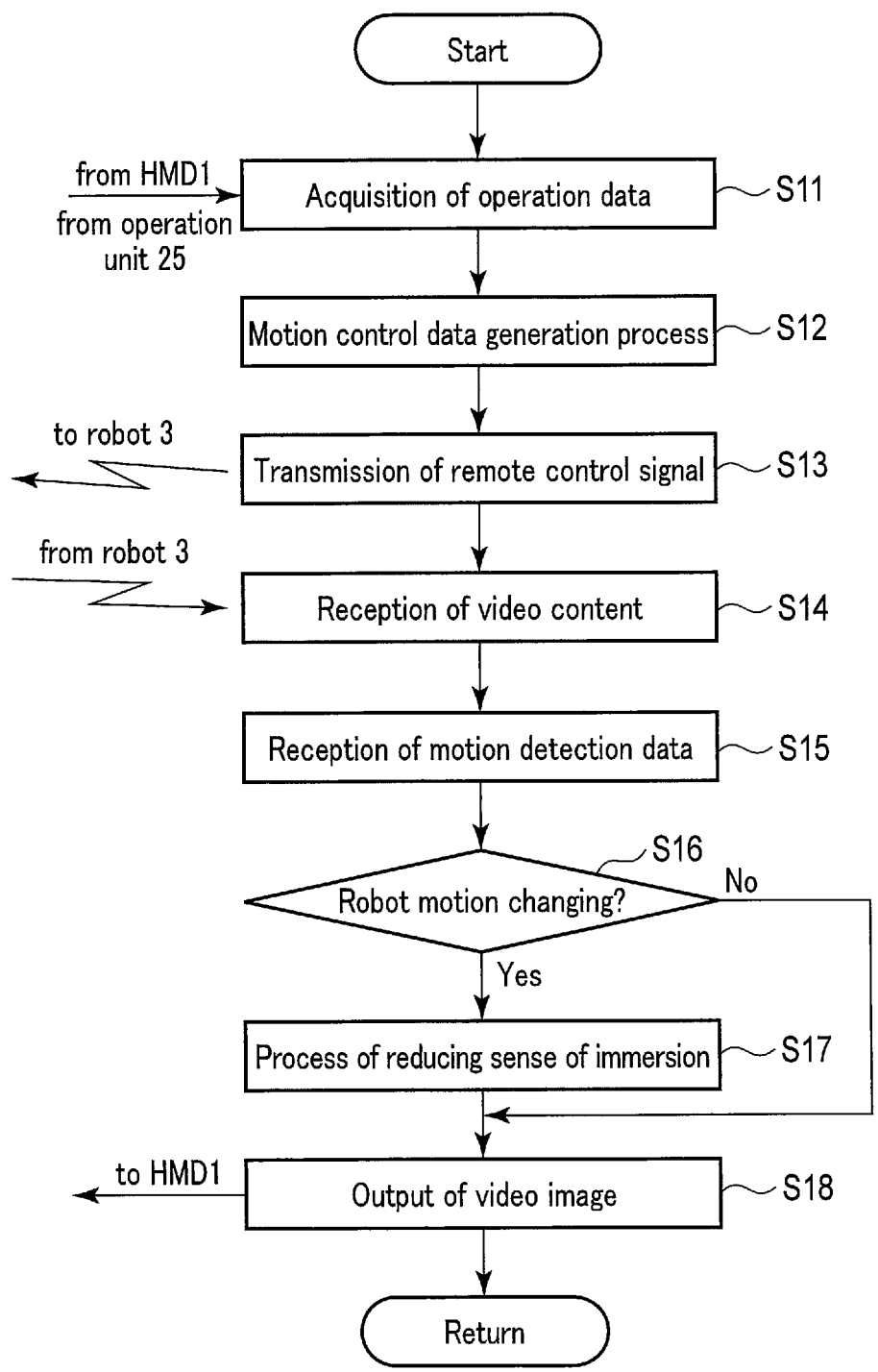
F I G. 6

REMOTE CONTROL SYSTEM, AND REMOTE OPERATION APPARATUS, VIDEO IMAGE PROCESSING APPARATUS, AND COMPUTER-READABLE MEDIUM

CROSS REFERENCE TO RELATED APPLICATIONS

This application is a Continuation application of PCT Application No. PCT/JP2021/018476, filed May 14, 2021 and based upon and claiming the benefit of priority from Japanese Patent Application No. 2020-085315, filed May 14, 2020, the entire contents of all of which are incorporated herein by reference.

FIELD

Embodiments of the present invention relate generally to, for example, a remote control system, in which a user apparatus controls via a network a remote operation apparatus located in a remote location, and a remote operation apparatus, a video image processing apparatus, and a program used in the system.

BACKGROUND

A system has been developed in which a user remotely controls via a network an operation apparatus located in a remote location while watching a video image displayed on a display device. In a system of this type, for example, a head mounted display (HMD) (hereinafter also referred to as a headset) is put on, for example, the head of a user. A user moves his/her body or operates a controller while watching a video image captured by a robot located in a remote location through a headset, thereby remotely controlling the motion of the robot.

In a system of this type, for example, an augmented reality (AR) technique or a virtual reality (VR) technique is used to generate an AR video image or a VR video image based on a video image transmitted from a robot and to display the generated video image on a headset. At this time, so-called tracking control is performed in which the displayed video image changes following the motion of the user's own body or the operation of the controller. As a result, the user can obtain a high sense of immersion during the operation.

However, there is a drawing delay (latency) from generation to display of the AR video image or the VR video image. The drawing delay (latency) includes a transmission delay that occurs when a video image generated by a robot in a remote location is transmitted to an apparatus on a headset side through a network. The transmission delay is not constant; that is, the amount of delay varies depending on, for example, the degree of congestion of the network or the load fluctuation of the processor of each apparatus. For this reason, a time lag occurs between the time when the user moves his/her body or operates the controller and the time when a video image corresponding to the motion is displayed on the headset, which may cause the user to feel motion sickness, that is, so-called "VR sickness (Virtual Reality Sickness)" or the like. The VR sickness occurs even when the amount of delay is constant, but remarkably appears particularly when the amount of the transmission delay includes so-called jitter which causes time variation.

Therefore, in order to reduce the influence of the time lag between the time point of the user's motion or operation of the controller and the time point when the video image is displayed in response to the motion or the operation, a technique has been proposed in which, for example, an apparatus on the headset side performs reprojection processing on the video image (see, for example, Patent Literature 1).

CITATION LIST

Patent Literature

Patent Literature 1: Jpn. Pat. Appln. KOKAI Publication No. 2019-106628

SUMMARY

Technical Problem

In the reprojection processing, for example, the following processes are performed. In one process, a video image generated based on a viewpoint position and a line-of-sight direction of a user at the time of generation of the video image is corrected using the viewpoint position and the line-of-sight direction at the time of display of the video image, thereby absorbing a time difference from the generation to the display of the video image. In another process, when an error occurs in stream distribution wherein a video stream does not arrive on time, the previous decoded video image is reused to perform reprojection processing on the previous decoded video image so as to match the latest position and posture of the headset, thereby coping with communication delay. That is, in the reprojection processing, the display video is corrected by performing complicated video image processing in the apparatus on the headset side. For this reason, the processing load of the processor due to the reprojection processing becomes very large in the apparatus on the headset side, which requires a high-performance processor, and consequently the apparatus may become expensive.

The present invention has been conceived in light of the above circumstances, and its object is to provide a technique for reducing VR sickness without performing complicated video image processing.

Solution to Problem

In order to solve the above-mentioned problems, according to a first aspect of the present invention, there is provided a remote control system including a user apparatus connected to a display unit and a remote operation apparatus configured to operate in response to a control signal transmitted from the user apparatus via a network. The remote operation apparatus includes: a movable unit capable of changing a posture; a video data acquisition unit configured to acquire video data acquired from a camera disposed in the movable unit; a motion detection data acquisition unit configured to acquire, through a motion sensor, motion detection data representing a change in the posture of the movable unit; and a data transmission unit configured to transmit the acquired video data and the acquired motion detection data to the user apparatus via the network. On the other hand, the user apparatus includes: a data reception unit configured to receive the video data and the motion detection data transmitted from the remote operation apparatus via the network; a determination unit configured to determine, based on the received motion detection data, a period when the posture of the movable unit is changing; a video image processing unit configured to perform, based on a determination result of the determination unit, a process of reducing a sense of immersion with respect to the video data received during the period when the posture of the movable unit is changing; and an output unit configured to output, to the display unit, data in which the sense of immersion has been reduced.

According to a second aspect of the present invention, there is provided a remote operation apparatus that is configured to operate in response to a control signal transmitted via a network from a user apparatus connected to a display unit and that includes a movable unit capable of changing a posture. The remote operation apparatus includes: a video data acquisition unit configured to acquire video data acquired from a camera disposed in the movable unit; a motion detection data acquisition unit configured to acquire, through a motion sensor, motion detection data representing a change in the posture of the movable unit; and a data transmission unit configured to transmit the acquired video data and the acquired motion detection data to the user apparatus via the network.

According to a third aspect of the present invention, there is provided a video image processing apparatus provided in either a user apparatus connected to a display unit or a remote operation apparatus that is configured to operate in response to a control signal transmitted from the user apparatus via a network and that includes a movable unit capable of changing a posture. The video image processing apparatus includes: a video data acquisition unit configured to acquire video data acquired from a camera disposed in the movable unit; a motion detection data acquisition unit configured to acquire, through a motion sensor, motion detection data representing a change in the posture of the movable unit; a determination unit configured to determine, based on the acquired motion detection data, a period when the posture of the movable unit is changing; a video image processing unit configured to perform, based on a determination result of the determination unit, a process of reducing a sense of immersion with respect to the video data acquired during the period when the posture of the movable unit is changing; and an output unit configured to output, to the display unit, data in which the sense of immersion has been reduced.

Advantageous Effects of Invention

According to the first aspect of the present invention, the video data acquired by the remote operation apparatus and the motion detection data representing the change in the posture of the remote operation apparatus are transmitted from the remote operation apparatus to the user apparatus via the network. On the other hand, in the user apparatus, the period when the change in the posture of the remote operation apparatus is changing is determined based on the motion detection data, a process of reducing the sense of immersion is performed on the video data received from the remote operation apparatus during this period, and the processed data is output to the display unit and displayed. For this reason, even if there is a transmission delay in the video data sent from the remote operation apparatus or there is a drawing delay in the display processing operation by the user apparatus, it is possible to reduce the inconvenience whereby the user suffers VR sickness due to the influence of the delay.

According to the second aspect of the present invention, in the remote operation apparatus, the period when the remote operation apparatus is moving is determined based on the motion detection data, and the process of reducing the sense of immersion is performed on the video data obtained by the camera during the period when the change in the posture of the remote operation apparatus is changing. Then, the data in which the sense of immersion has been reduced is transmitted from the remote operation apparatus to the user apparatus.

Therefore, during the period when the remote operation apparatus is moving, the video data in which the sense of immersion has been reduced is transmitted from the remote operation apparatus to the user apparatus and displayed on the display unit. For this reason, even if there is a transmission delay in the video data transmitted from the remote operation apparatus or there is a drawing delay in the video image display process in the user apparatus or the display unit, it is possible to reduce the inconvenience whereby the user suffers VR sickness due to the influence of the delay.

In addition, according to the second aspect, since the process of reducing the sense of immersion is performed on the video image in the remote operation apparatus, it is possible to reduce the processing load of the user apparatus and to use a general-purpose user apparatus having no processing function for reducing the sense of immersion.

According to the third aspect of the present invention, in either the remote operation apparatus or the user apparatus, the process of reducing the sense of immersion is performed on the video data obtained during the period when the change in the posture of the remote operation apparatus is changing, and the processed data is output from the user apparatus to the display unit. For this reason, even if there is a transmission delay in the video data transmitted from the remote operation apparatus or there is a drawing delay in the video image display process in the user apparatus or the display unit, it is possible to reduce the inconvenience whereby the user suffers VR sickness due to the influence of the delay.

That is, according to each aspect of the present invention, it is possible to provide a technique for reducing VR sickness without performing complicated video image processing.

BRIEF DESCRIPTION OF THE DRAWINGS

FIG. 2 is a block diagram showing a hardware configuration of a robot used as a remote operation apparatus in the remote control system shown in FIG. 1.

FIG. 3 is a block diagram showing a hardware configuration of a head mounted display worn by a user in the remote control system shown in FIG. 1.

FIG. 4 is a block diagram showing a hardware configuration of an information processing apparatus used as a user apparatus in the remote control system shown in FIG. 1.

FIG. 6 is a flowchart showing procedures and details of processing executed by the information processing apparatus shown in FIG. 5.

DETAILED DESCRIPTION

Embodiments of the present invention will be described below with reference to the drawings.

First Embodiment

Configuration Example (1) System

Figure 1:
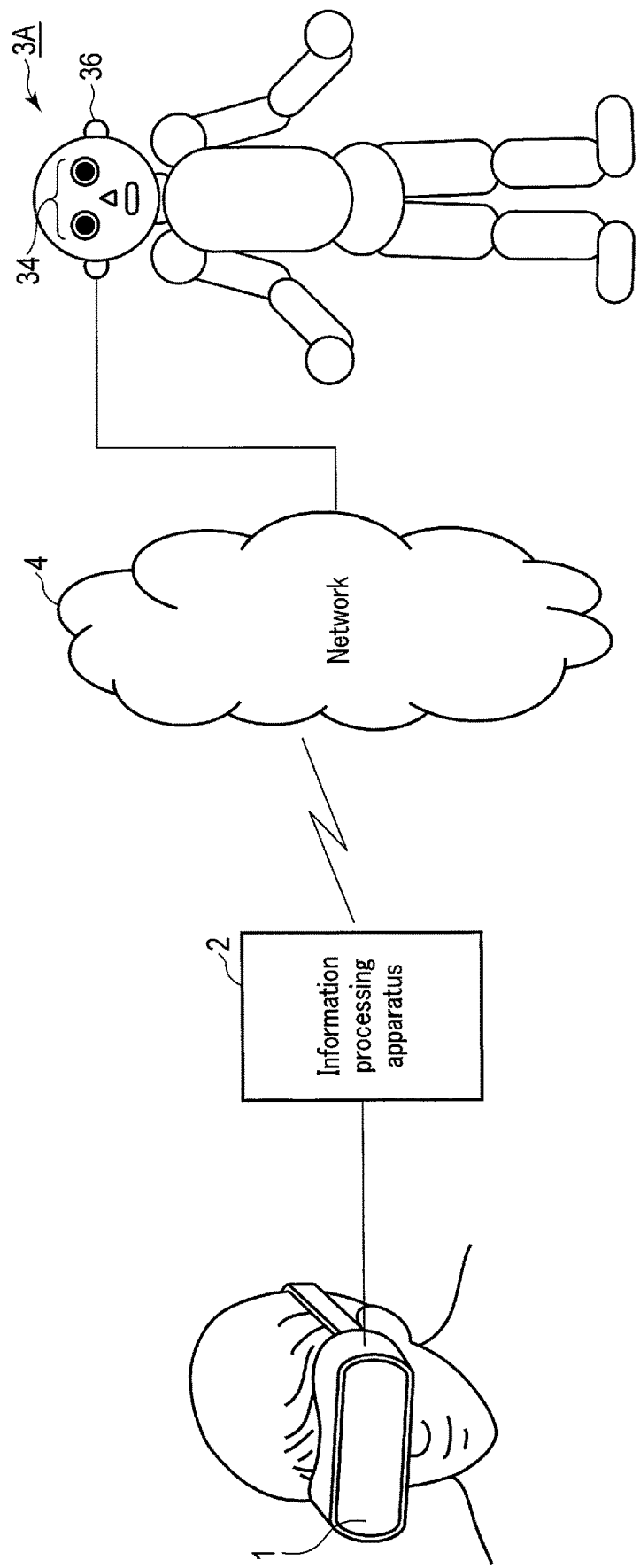
FIG. 1 is a diagram showing an overall configuration of a remote control system according to a first embodiment of the present invention.

FIG. 1 is a diagram showing an overall configuration of a remote control system according to a first embodiment of the present invention.

The remote control system according to the first embodiment includes a head mounted display (HMD) 1, an information processing apparatus 2 that operates as a user apparatus, and a remote operation apparatus 3 that enables communications with the information processing apparatus 2 via a network 4. Although a case where the user apparatus includes only the information processing apparatus 2 is described here as an example, the user apparatus may include both the information processing apparatus 2 and the HMD 1.

The network 4 includes, for example, a public internet protocol (IP) network such as the Internet, and an access network for accessing the public IP network. The access network includes a local area network (LAN), a wireless LAN, a public wired network, a public mobile communication network, and a cable television (CATV) network.

(2) Apparatus (2-1) Remote Operation Apparatus 3

The remote operation apparatus 3 is composed of, for example, a humanoid robot that operates in a remote location. The remote operation apparatus 3 is hereinafter also referred to as a robot. The robot 3A includes a body, a head, arms, and legs. Each of the head, the arms, and the legs is configured to operate within a predetermined movable range by a drive unit including a servo mechanism, so that the posture can be variously changed.

A camera 34 is disposed as an imaging device in a front portion of the head of the robot 3A, that is, a portion corresponding to the face. A motion sensor is provided in the head of the robot 3A to detect its motion. Furthermore, a microphone 36 is also disposed in a position corresponding to a side of the head of the robot 3A.

FIG. 2 is a block diagram showing a hardware configuration of the robot 3A.

The robot 3A includes, for example, a control unit 31. The control unit 31 includes a hardware processor such as a central processing unit (CPU). A storage unit 32, a sensor interface (sensor I/F) 33, a drive interface (drive I/F) 37, and a communication interface (communication I/F) 39 are connected to the control unit 31 via a bus 30.

The storage unit 32 uses a non-volatile memory such as a solid state drive (SSD) that can be written and read at any time as a storage medium, and includes a program storage area and a data storage area. Various application programs for realizing operations of the robot 3A are stored in the program storage area. The data storage area is used to store various data acquired or generated in the course of operations of the robot 3A. As the storage medium, a read only memory (ROM), a random access memory (RAM), or the like may also be used in combination.

The camera 34, a motion sensor 35, and the microphone 36 are connected to the sensor I/F 33. The camera 34 is composed of, for example, a twin-lens camera, captures an image in the front direction of the robot 3A within a range of a predetermined viewing angle (for example, 130 degrees), and outputs obtained stereoscopic video data to the sensor I/F 33. The motion sensor 35 includes, for example, a six-axis acceleration sensor, detects a motion in six axis directions of the head of the robot 3A, and outputs the detected motion data to the sensor I/F 33. The microphone 36 detects sound around the robot 3A, and outputs the obtained audio data to the sensor I/F 33.

A drive unit 38 for driving the head, the arms, and the legs is connected to the drive I/F 37. The drive I/F 37 converts a control signal output from the control unit 31 into a drive signal, and outputs the converted drive signal to the drive unit 38 to operate the drive unit 38.

The communication I/F 39 includes an interface conforming to, for example, a wireless LAN, a short-range wireless data communication standard (for example, Bluetooth (registered trademark)), or a public mobile communication network, and performs data transmission with the information processing apparatus 2 via the network 4. The communication I/F 30 may include an interface conforming to a wired network such as a public wired network, a wired LAN, or a CATV network.

The control unit 31 operates the drive unit 38 in accordance with a remote control signal sent from the information processing apparatus 2 to change the postures of the head, the arms, and the legs of the robot 3A. Examples of the operation to be controlled include variably controlling the imaging direction of the camera 34 by rotating the head, for example, in a pan direction, a tilt direction, or the like. In addition, by driving the legs, various motions of the robot 3A, such as a walking motion in the front-rear direction or the left-right direction or a bending or stretching motion in the up-down direction, are assumed. Instead of the humanoid robot 3A, the remote operation apparatus may be, for example, an industrial robot or simply a stand on which a monitoring camera is disposed.

The control unit 31 also receives stereoscopic video data obtained by the camera 34 via the sensor I/F 33. Then, the control unit 31 performs a process of packetizing the received stereoscopic video data in accordance with a predetermined format, and transmitting the packetized data from the communication I/F 39 to the information processing apparatus 2. At that time, audio data detected by the microphone 36 may be multiplexed with the stereoscopic video data and transmitted.

Further, the control unit 31 receives, via the sensor I/F 33, data representing the change in head posture detected by the motion sensor 35. Then, the control unit 31 performs a process of generating motion detection data by adding time data representing a detection time to the received detection data, and transmitting the motion detection data from the communication I/F 39 to the information processing apparatus 2. The time data is used to control the sense of immersion of the user in the stereoscopic video image when the stereoscopic video data is displayed on the information processing apparatus 2 described later.

(2-2) Head Mounted Display (HMD) 1

The HMD 1 has a goggle shape, for example, and is detachably mounted on the head of the user. FIG. 3 is a block diagram showing a hardware configuration of the HMD 1.

In the HMD 1, a storage unit 12, a display interface (display I/F) 13, a sensor interface (sensor I/F) 15, and a communication interface (communication I/F) 17 are connected via a bus 10 to a control unit 11 including, for example, a CPU. In addition, devices such as various switches, a microphone, a speaker, a camera, and a position sensor may be connected to the control unit 11.

The storage unit 12 uses a non-volatile memory, such as an SSD, that can be written and read at any time as a storage medium, and includes a program storage area and a data storage area. Various application programs for realizing operations of the HMD 1 are stored in the program storage area. The data storage area is used to store various data acquired or generated in the course of operations of the HMD 1. As the storage medium, a ROM, a RAM, or the like may also be used in combination.

A display unit 14 is connected to the display I/F 13. The display unit 14 includes, for example, two display panels including an organic electro luminescence (EL) display so as to correspond to left and right eyes of the user in order to support virtual reality (VR) display. The number of display panels may be one. The display unit 14 is not limited to the organic EL display, and may be another type of display such as a liquid crystal display (LCD) or a display using seven segments. The display I/F 13 causes the display unit 14 to display video data generated by the information processing apparatus 2 which is described later.

A motion sensor 16 is connected to the sensor I/F 15. The motion sensor 16 includes, for example, a six-axis angular velocity sensor (gyro sensor), and is used to detect a motion of the HMD 1, that is, a motion of the head of the user. The motion of the head to be detected is preferably, for example, a motion in six axis directions, but may be a motion in only two axis directions of pan and tilt. The sensor I/F 15 generates motion data representing the motion of the head of the user based on an output signal from the motion sensor 16.

In addition to the motion sensor 16, a magnetic sensor, an acceleration sensor, a position sensor, an infrared sensor, a luminance sensor, a proximity sensor, a camera, or the like may be connected to the sensor I/F 15. In addition to the motion of the head of the user, a sensor for detecting a motion of the line of sight of the user may be connected to the sensor I/F 15. The motion of the line of sight of the user can be detected, for example, with a camera that captures an image of the user's eyeball.

As the communication I/F 17, for example, a wired interface using a signal cable such as a universal serial bus (USB) cable is used. Under the control of the control unit 11, the communication I/F 17 receives the video data transmitted from the information processing apparatus 2 and transfers the motion data or the like generated by the sensor I/F 15 to the information processing apparatus 2. Note that a short-range wireless data communication standard (for example, Bluetooth (registered trademark)) may be used for the communication I/F 17.

In this example, a multi-function device including the control unit 11 and the storage unit 12 is described as an example of the HMD 1. However, the HMD 1 may be a standard or simplified device having only the display unit 14, the display I/F 13, the motion sensor 16, and the sensor I/F 15.

(2-3) Information Processing Apparatus 2

Figure 5:
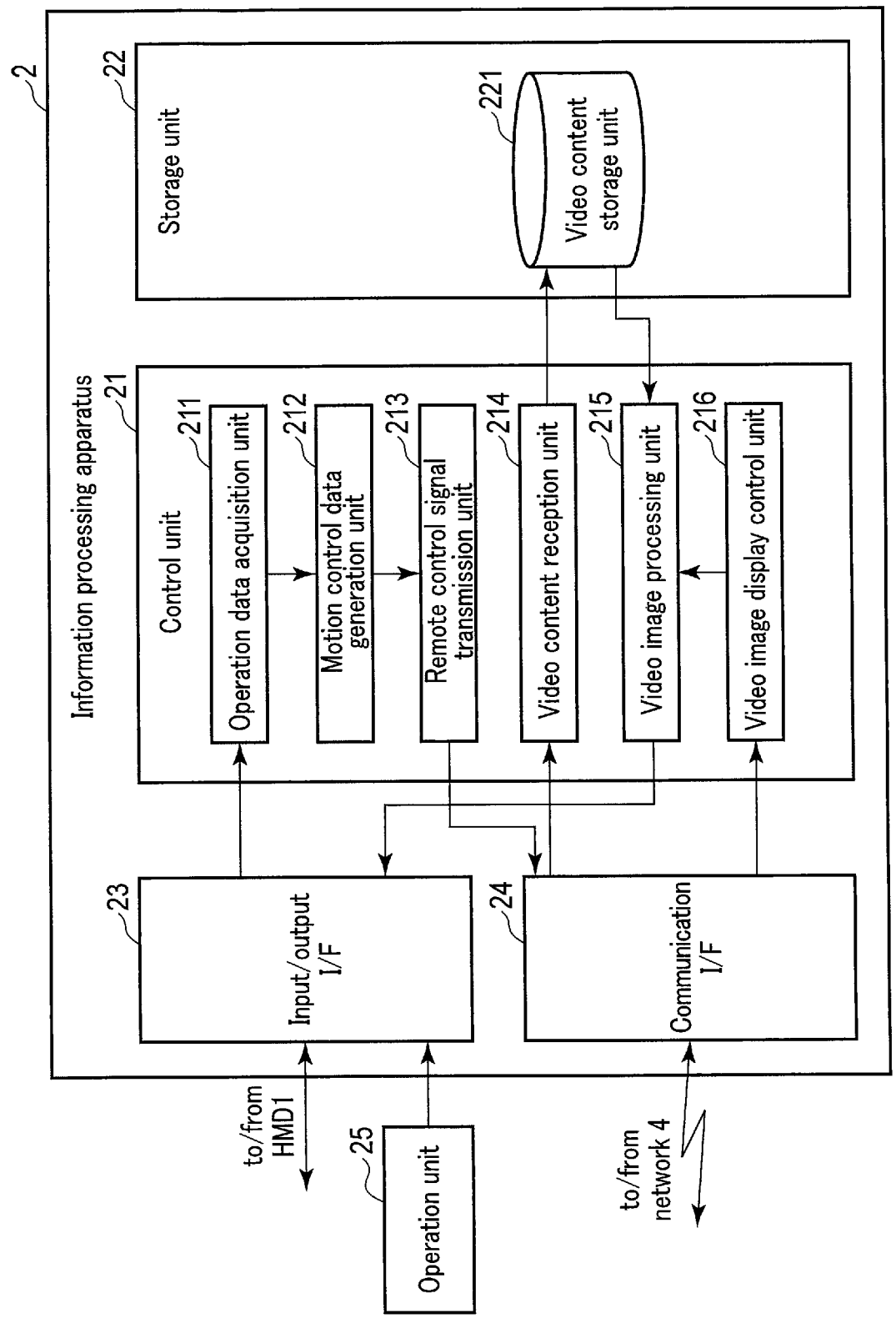
FIG. 5 is a block diagram showing a software configuration of the information processing apparatus used as the user apparatus in the remote control system shown in FIG. 1.

FIGS. 4 and 5 are block diagrams respectively showing hardware and software configurations of the information processing apparatus 2 used as a user apparatus.

The information processing apparatus 2 is configured by, for example, a mobile information terminal such as a smartphone or a tablet terminal, or a notebook or stationary personal computer. In the information processing apparatus 2, a control unit 21 including a hardware processor such as a CPU is connected via a bus 20 to a storage unit 22, an input/output interface (input/output I/F) 23, and a communication interface (communication I/F) 24.

The HMD 1 is connected to the input/output I/F 23 via the USB cable or a wireless interface. An operation unit 256 such as a controller is connected to the input/output I/F 23. The operation unit 25 is used to input a control target portion, a control direction, and a control amount when the user controls the operation of the robot 3A.

The communication I/F 24 includes an interface supporting, for example, a wireless LAN, a short-range wireless data communication standard (for example, Bluetooth (registered trademark)), or a public mobile communication network, and performs data transmission with the robot 3A via the network 4. The communication I/F 24 may include an interface conforming to a wired network such as a public wired network, a wired LAN, or a CATV network.

The storage unit 22 is configured by combining, as a storage medium, for example, a non-volatile memory such as an HDD or an SSD that can be written and read at any time, a non-volatile memory such as a ROM, and a volatile memory such as a RAM. The storage area includes a program storage area and a data storage area. The program storage area stores middleware such as an operating system (OS), and in addition, application programs necessary for executing various control processes according to the first embodiment of the present invention.

The data storage area includes a video content storage unit 221. When displaying the stereoscopic video data transmitted from the robot 3A, the video content storage unit 221 is used as a buffer memory for performing a predetermined process on the stereoscopic video data.

The control unit 21 includes, as control processing functions for realizing the first embodiment of the present invention, an operation data acquisition unit 211, a motion control data generation unit 212, a remote control signal transmission unit 213, a video content reception unit 214, a video image processing unit 215, and a video image display control unit 216. These control processing functions are all realized by causing the hardware processor of the control unit 21 to execute application programs stored in the program storage area in the storage unit 22.

The operation data acquisition unit 211 receives operation data input in the operation unit 25 via the input/output I/F 23. At the same time, the operation data acquisition unit 211 receives motion detection data obtained by the motion sensor 16 of the HMD 1 via the input/output I/F 23. Then, the operation data acquisition unit 211 transfers the received operation data and motion detection data to the motion control data generation unit 212.

The motion control data generation unit 212 generates motion control data for controlling the motion of the robot 3A based on the operation data and the motion detection data. The motion control data includes information representing a control target portion, a control direction, and a control amount of the robot 3A.

The remote control signal transmission unit 213 performs a process of transmitting a remote control signal including the motion control data generated by the motion control data generation unit 212 from the communication I/F 24 to the robot 3A.

The video content reception unit 214 receives, via the communication I/F 24, the video content transmitted from the robot 3A via the network 4, that is, the stereoscopic video data. Then, the video content reception unit 214 performs a process of depacketizing and decoding the received stereoscopic video data, and then storing the data in the video content storage unit 221.

The video image processing unit 215 reads out the stereoscopic video data from the video content storage unit 221, generates display data for AR display or VR display, and outputs the generated display data from the input/output I/F 23 to the HMD 1.

The video image display control unit 216 receives the motion detection data transmitted from the robot 3A via the communication I/F 24. Then, the video image display control unit 216 determines, based on the received motion detection data, a period when the posture of the head of the robot 3A is changing, and performs a process of reducing the sense of immersion with respect to the display data generated by the video image processing unit 215 during the period when the posture of the head is changing.

Operation Example

Next, an operation example of the remote control system having the aforementioned configuration will be described. FIG. 6 is a flowchart showing procedures and details of processing executed by the information processing apparatus 2.

When the user mounts the HMD 1 on his/her head and then activates the information processing apparatus 2, the communication I/F 17 of the HMD 1 and the input/output I/F 23 of the information processing apparatus 2 are first connected to each other, and further, a communication link is formed between the communication I/F 24 of the information processing apparatus 2 and the communication I/F 39 of the robot 3A via the network 4.

In this state, the user operates the operation unit 25 to operate the robot 3A, and the operation data is input to the information processing apparatus 2. Even when the user moves his/her head, the motion is detected by the motion sensor 16 and input to the information processing apparatus 2. Under the control of the operation data acquisition unit 211, the information processing apparatus 2 acquires the operation data and the motion detection data in step S11. Then, under the control of the motion control data generation unit 212, in step S12, the information processing apparatus 2 generates motion control data for controlling the motion of the robot 3A based on each of the acquired data mentioned above.

For example, the motion control data generation unit 212 recognizes a control target portion of the robot 3A, and a control direction and a control amount thereof from the operation data. For example, the amount of motion of the legs in the front-rear direction or the left-right direction is recognized. Further, the amount of change in the direction of the head of the robot 3A is recognized from the motion detection data.

Under the control of the remote control signal transmission unit 213, in step S13, the information processing apparatus 2 generates a remote control signal including the motion control data generated by the motion control data generation unit 212 and transmits the generated remote control signal from the communication I/F 24 to the robot 3A.

The robot 3A, under the control of the control unit 31, upon receipt of the remote control signal transmitted from the information processing apparatus 2, extracts the motion control data from the remote control signal, and operates the corresponding drive unit 38 with the drive I/F 37 based on the information specifying the control target portion, the control direction, and the control amount included in the motion control data. For example, if the control target portion is the legs or the head, the drive unit 38 corresponding to the legs or the head is operated. As a result, the robot 3A walks and moves in, for example, the front-rear direction or the left-right direction, or changes the direction of the head.

Furthermore, the control unit 31 of the robot 3A captures stereoscopic video data from the camera 34 mounted on the head via the sensor I/F 33 in a state where the legs or the head is moved. At the same time, the control unit 31 captures motion detection data of the head from the motion sensor 35 via the sensor I/F 33. Then, the control unit 31 transmits the captured video data and motion detection data from the communication I/F 39 to the information processing apparatus 2. It should be noted that audio data detected by the microphone 36 may be multiplexed with the stereoscopic video data and transmitted. Time data representing a detection time is added to the detection data.

The information processing apparatus 2 receives the stereoscopic video data transmitted from the robot 3A under the control of the video content reception unit 214 in step S14. In step S14, the information processing apparatus 2 performs, for example, a process of depacketizing and decoding the received stereoscopic video data, and then storing the depacketized and decoded data in the video content storage unit 221. Then, under the control of the video image processing unit 215, the information processing apparatus 2 reads the stereoscopic video data from the video content storage unit 221, performs an information addition process such as adding additional information or the like to the read stereoscopic video data as necessary, and generates display data. The generated display data is output from the input/output I/F 23 to the HMD 1 in step S18. As a result, the stereoscopic video image captured by the camera 34 of the robot 3A is displayed on the display unit 14 in the HMD 1 almost in real time.

In the process of displaying the stereoscopic video image described above, the information processing apparatus 2 performs a process of controlling the sense of immersion of the user with respect to the displayed stereoscopic video image as follows.

Specifically, under the control of the video image display control unit 216, in step S15, the information processing apparatus 2 receives the motion detection data transmitted from the robot 3A. Then, in step S16, a period when the head of the robot 3A is moving, i.e., a period when the posture of the head is changing, is determined based on the received motion detection data. Suppose that, as a result of this determination, a period when the posture of the robot 3A is changing is detected. In this case, the video image display control unit 216 reduces, in step S17, the sense of immersion of the user during the period when the detected head posture is changing with respect to the display data generated by the video image processing unit 215.

As a process of reducing the sense of immersion, for example, a process of stilling or erasing the display of the stereoscopic video image may be considered. As the process of erasing, for example, a process of replacing the display data with white, black, gray, or other predetermined single-color image data, a process of replacing the display data with predetermined standby image data stored in advance in the storage unit 32, or the like is considered. At this time, a message, a mark, an icon, or an avatar indicating that the robot 3A is operating may be superimposed on the single-color image data or the standby image data.

As another process of reducing the sense of immersion, for example, a process for changing the display data to a translucent state or to a state of a coarse pixel density, or a process of reducing the size of the display data and displaying the data at any position of the display unit 14 of the HMD 1 is also considered. In this case, the display position of the display data is not limited to the central portion but may be any position. In short, any method may be used as long as it is a display method capable of reducing the user's sense of immersion in the displayed video image.

Furthermore, a voice message, melody, or ringing sound indicating that the robot 3A is operating may be output from a speaker built in the HMD 1 in place of the audio data sent from the robot 3A or may be superimposed on the audio data sent from the robot 3A.

(Operation and Effect)

As described above, in the remote control system according to the first embodiment, in the robot 3A, a change in the posture of a predetermined portion, such as the head, arms, or legs, is detected by the motion sensor 35, and data representing the detected motion is transmitted to the information processing apparatus 2 via the network 4 together with the stereoscopic video data obtained by the camera 34. On the other hand, the information processing apparatus 2 performs a process of outputting the display data including the stereoscopic video data sent from the robot 3A to the HMD 1 for display, and at the same time, determining, based on the motion detection data sent from the robot 3A, a period when the posture of the robot 3A is changing, and reducing the sense of immersion received by the user on the display data during the period.

Therefore, during the period when the robot 3A is moving, the display data in which the sense of immersion has been reduced is supplied to the HMD 1 and displayed. For this reason, even if there is a transmission delay in the video data sent from the robot 3A or there is a drawing delay in the display processing operation by the information processing apparatus 2 or the HMD 1, it is possible to reduce the inconvenience whereby the user suffers VR sickness due to the influence of the delay.

Second Embodiment

According to a second embodiment of the present invention, a robot as a remote operation apparatus determines, based on detection data of a motion sensor, whether or not the robot is operating, and performs a process of reducing a sense of immersion with respect to video data obtained by a camera during a period when the posture of the robot is changing. Then, the video data in which the sense of immersion has been reduced is transmitted from the robot to an information processing apparatus as a user apparatus.

Configuration Example

Figure 7:
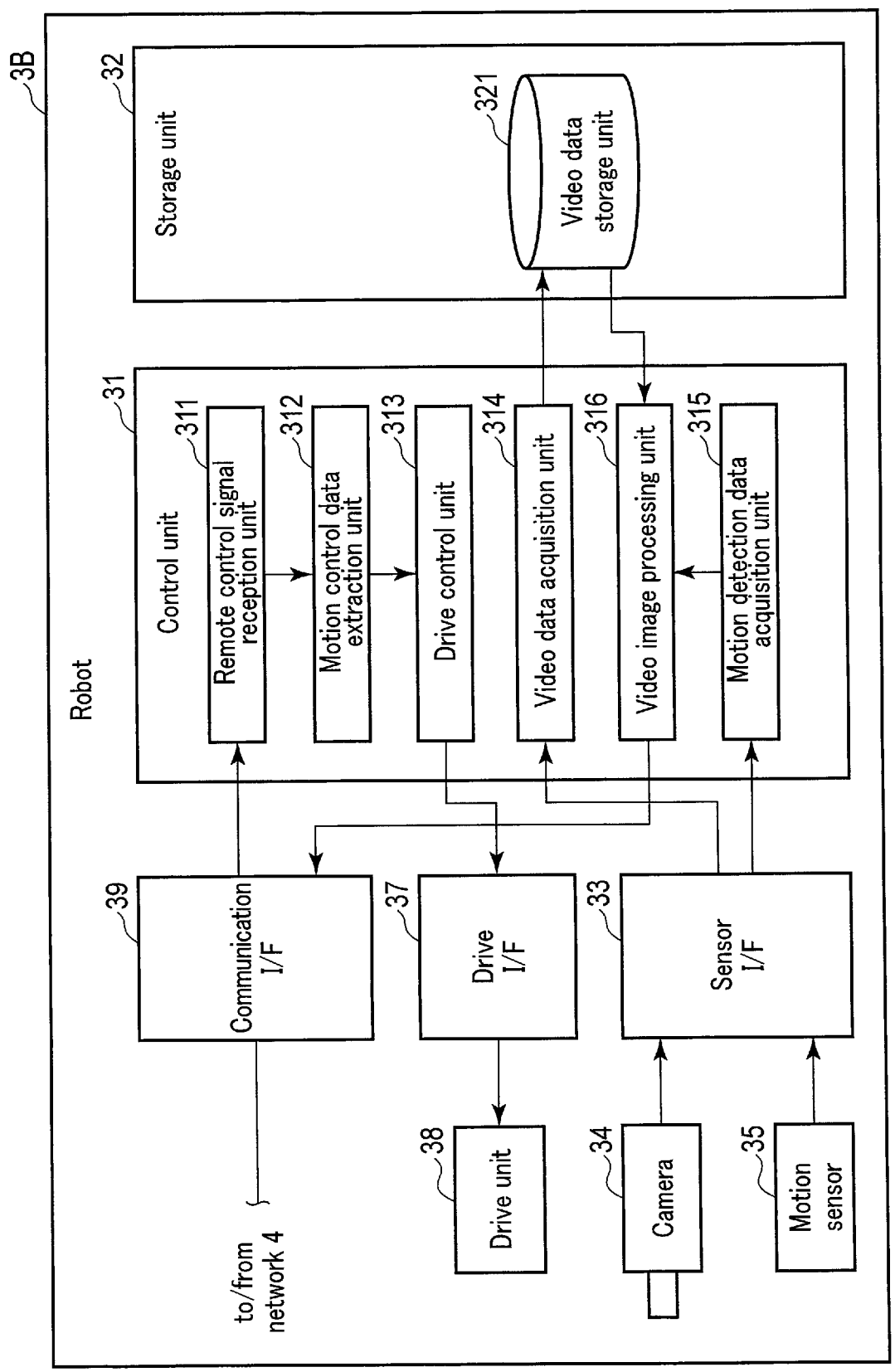
FIG. 7 is a block diagram showing a software configuration of a robot used as a remote operation apparatus in a remote control system according to a second embodiment of the present invention.

FIG. 7 is a block diagram showing a software configuration of a robot 3B as a remote operation apparatus according to the second embodiment of the present invention. Since the hardware configuration of the robot 3B is identical to that shown in FIG. 2, the illustration thereof is omitted.

A control unit 31 of the robot 3B includes, as control processing units according to the second embodiment of the present invention, a remote control signal reception unit 311, a motion control data extraction unit 312, a drive control unit 313, a video data acquisition unit 314, a motion detection data acquisition unit 315, and a video image processing unit 316. Each of these control processing units is realized by causing the hardware processor of the control unit 31 to execute a program stored in the storage unit 32.

The remote control signal reception unit 311 performs a process of receiving a remote control signal transmitted from the information processing apparatus 2 via the communication I/F 39 and transferring the received remote control signal to the motion control data extraction unit 312.

The motion control data extraction unit 312 performs a process of extracting motion control data from the remote control signal and transferring the motion control data to the drive control unit 313.

The drive control unit 313 selects the corresponding drive unit 38 on the basis of the information specifying the control target portion included in the extracted motion control data, and generates a drive control signal for driving the selected drive unit 38 on the basis of the information specifying the control direction and the control amount included in the motion control data. Then, the drive control unit 313 performs a process of outputting the generated drive control signal from the drive I/F 37 to the drive unit 38.

The video data acquisition unit 314 performs a process of receiving stereoscopic video data captured by the camera 34 via the sensor I/F 33, and temporarily storing the stereoscopic video data in the video data storage unit 321 for video image processing to be described later.

The motion detection data acquisition unit 315 acquires, via the sensor I/F 33, data representing the motion of the head of the robot 3B detected by the motion sensor 35. Then, the motion detection data acquisition unit 315 determines, based on the acquired motion detection data, a period when the posture of the head of the robot 3B is changing, and performs a process of notifying the video image processing unit 316 of information indicating the determination result.

In accordance with the information indicating the determination result reported by the motion detection data acquisition unit 315, during a period when the posture of the head is not changing, the video image processing unit 316 performs a process of transmitting as-is the stereoscopic video data stored in the video data storage unit 321 from the communication I/F 39 to the information processing apparatus 2. On the other hand, during a period when the posture of the head is changing, the video image processing unit 316 performs a process of reducing the sense of immersion with respect to the stereoscopic video data stored in the video data storage unit 321, and performs a process of transmitting the processed data from the communication I/F 39 to the information processing apparatus 2.

Operation Example

Figure 8:
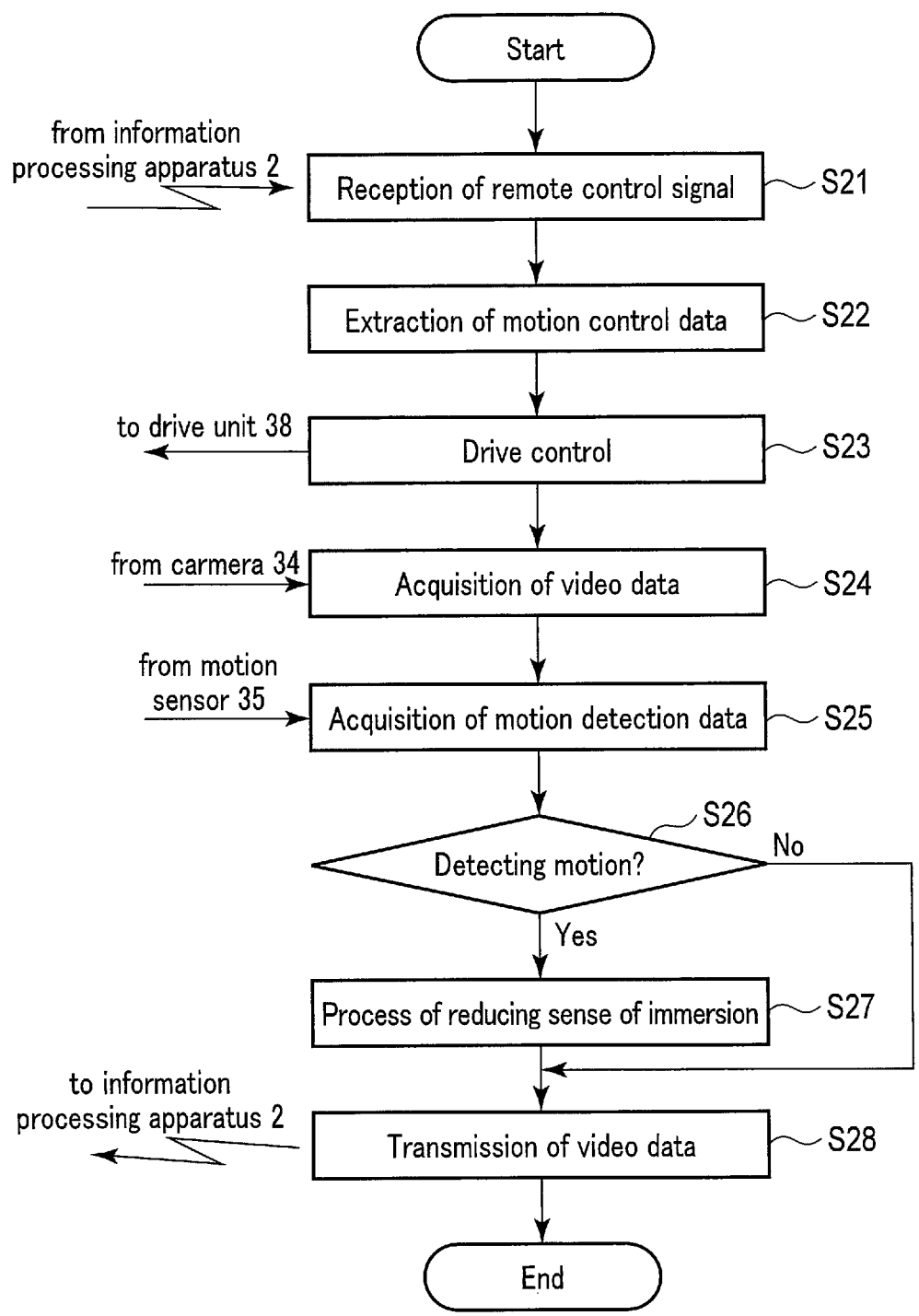
FIG. 8 is a flowchart showing procedures and details of processing executed by the robot shown in FIG. 7.

Next, an operation of the robot 3B having the aforementioned configuration will be described. FIG. 8 is a flowchart showing the procedures and details of the control processing.

When the remote control signal including the motion control data is sent from the information processing apparatus 2, the robot 3B receives the remote control signal via the communication I/F 39 in step S21 under the control of the remote control signal reception unit 311. Then, under the control of the motion control data extraction unit 312, the robot 3B extracts the motion control data from the remote control signal in step S22.

Next, under the control of the drive control unit 313, in step S23, the robot 3B selects the corresponding drive unit 38 based on the information specifying the control target portion included in the motion control data. Then, on the basis of the information specifying the control direction and the control amount included in the motion control data, the robot 3B generates a drive control signal for driving the selected drive unit 38 and outputs the generated drive control signal from the drive I/F 37 to the drive unit 38. As a result, the drive unit 38 is driven and the corresponding portion is operated.

For example, if the control target portion is the legs, the corresponding drive unit 38 is driven, and the robot 3B performs a walking motion in, for example, the front-rear direction. If the control target portion is the head, the corresponding drive unit 38 is driven to change the direction of the head to a pan direction or a tilt direction.

On the other hand, in a state where the legs or the head is moving, under the control of the video data acquisition unit 314, in step S24, the control unit 31 of the robot 3B captures stereoscopic video data from the camera 34 mounted on the head via the sensor I/F 33 and temporarily stores the stereoscopic video data in the video data storage unit 321.

At the same time, under the control of the motion detection data acquisition unit 315, in step S25, the control unit 31 of the robot 3B captures motion detection data representing a motion of the head of the robot 3B, that is, a change in posture of the head, from the motion sensor 35 via the sensor I/F 33. Then, based on the captured motion detection data, in step S26, the control unit 31 of the robot 3B determines a period when the head of the robot 3B is moving.

Subsequently, under the control of the video image processing unit 316, the control unit 31 of the robot 3B performs a process of transmitting video data as described below, based on the determination result. Specifically, if the determination result obtained in step S26 indicates that the posture of the head of the robot 3B has not changed, the stereoscopic video data is read from the video data storage unit 321, and is transmitted from the communication I/F 39 to the information processing apparatus 2 in step S28.

On the other hand, as a result of the determination in step S26, during a period when the posture of the head of the robot 3B is changing, the video image processing unit 316 performs a process of reducing the sense of immersion with respect to the stereoscopic video data stored in the video data storage unit 321 in step S27. Then, the processed data is transmitted from the communication I/F 39 to the information processing apparatus 2.

Here, as the process of reducing the sense of immersion, for example, the following process is used. For example, the stereoscopic video data is stilled or replaced with white, black, gray, or other single-color image data of a predetermined color. Alternatively, the stereoscopic video data may be replaced with predetermined standby image data separately stored in the storage unit 32. At this time, a message, a mark, an icon, or an avatar indicating that the robot 3B is moving may be superimposed on the standby image data.

Further, as another process of reducing the sense of immersion, for example, the stereoscopic video data may be processed to be a translucent state or to a state of a coarse pixel density, or the frame size of the stereoscopic video image may be reduced. In a case of reducing the frame size, the position of the stereoscopic video data is not limited to the central portion but may be any position. In short, any video image processing method may be used as long as it can reduce the user's sense of immersion in the video data sent from the robot 3B.

Supplementarily, the control unit 31 may perform a process of superimposing a voice message, melody, or ringing sound indicating that the robot 3B is in operation on the ambient sound of the robot 3B detected by the microphone 36 or replacing the ambient sound with such a voice message, melody, or ringing sound, and may transmit the processed audio data from the communication I/F 39 to the information processing apparatus 2.

(Operation and Effect)

As described above, in the second embodiment of the present invention, the robot 3B determines, based on the motion detection data from the motion sensor 35, the period when the posture of the robot 3B is changing, performs a process of reducing the sense of immersion with respect to the stereoscopic video data obtained by the camera 34 during the period when the posture of the robot 3B is changing, and transmits the video data in which the sense of immersion has been reduced from the robot 3B to the information processing apparatus 2.

Therefore, during the period when the posture of the robot 3B is changing, the video data in which the sense of immersion has been reduced is transmitted from the robot 3B to the information processing apparatus 2 and displayed on the HMD 1. For this reason, even if there is a transmission delay in the video data transmitted from the robot 3B or there is a drawing delay in the video image display process in the information processing apparatus 2 or the HMD 1, it is possible to reduce the inconvenience whereby the user suffers VR sickness due to the influence thereof.

According to the second embodiment, since the process of reducing the sense of immersion is performed on the stereoscopic video image in the robot 3B, there is an advantage whereby the processing load of the information processing apparatus 2 can be reduced, and a general-purpose information processing apparatus having no processing function for reducing the sense of immersion can be used.

Other Embodiments (1) In the first and second embodiments, an example has been described in which when a walking motion of the robot 3A or 3B in the front-rear direction or the left-right direction or a motion of changing the direction of the head in the pan direction or the tilt direction is detected, the process of reducing the sense of immersion is performed on the stereoscopic video image obtained by the camera 34. However, the present invention is not limited thereto, and when a motion of inclining the head of the robot 3A or 3B to the left or right, a bowing motion, or a bending or stretching motion using the legs is detected, a process of reducing the sense of immersion may be performed on the stereoscopic video image obtained by the camera 34.

(2) In the first and second embodiments, when the robot 3A or 3B moves in response to a remote control signal sent from the information processing apparatus 2, the motion is detected by the motion sensor 35 and a process of reducing the sense of immersion is performed on the video data obtained during the period when the motion is detected. However, the present invention is not limited thereto, and the motion of the robot 3A or 3B may be detected when the robot 3A or 3B operates autonomously regardless of a remote control signal from the information processing apparatus 2, or when the robot 3A or 3B operates according to a remote control signal transmitted from another information processing apparatus or a controller attached to the robot, so that a process of reducing the sense of immersion can be performed on the video data obtained during the period when the motion is detected.

(3) In the first embodiment, the information processing apparatus 2 provided separately from the HMD 1 performs data communications with the robot 3A and video image display control. However, in a case where the HMD 1 has the function of the information processing apparatus 2, that is, in a case where the HMD is integrated with the information processing apparatus 2, the HMD 1 may be configured to perform data communications with the robot 3A and video image display control.

(4) In addition, various improvements and modifications can be made to the type and configuration of the remote operation apparatus, the type and configuration of the imaging device and the motion sensor, the configuration of the information processing apparatus, the process of reducing the sense of immersion, and the like, without departing from the scope of the invention. In other words, a specific configuration according to an embodiment may be adopted as appropriate when implementing the present invention.

The present invention should not be limited to the above-described embodiments as-is, but may be embodied by modifying the components without departing from the scope of the invention at the implementation stage. In addition, various inventions may be constituted by appropriately combining a plurality of components disclosed in the embodiments. For example, some components may be omitted from the components shown in the embodiments. Furthermore, the components of different embodiments may be suitably combined.

REFERENCE SIGNS LIST

1 . . . head mounted display (HMD)
2 . . . information processing apparatus
3A, 3B . . . robot
4 . . . network
10, 20, 30 . . . bus
11, 21, 31 . . . control unit
12, 22, 32 . . . storage unit
13 . . . display interface (display I/F)
14 . . . display unit
15, 33 . . . sensor interface (sensor I/F)
16, 35 . . . motion sensor
17, 24, 39 . . . communication interface (communication I/F)
23 . . . input/output interface (input/output I/F)
25 . . . operation unit
34 . . . camera
36 . . . microphone
37 . . . drive interface (drive I/F)
38 . . . drive unit
211 . . . operation data acquisition unit
212 . . . motion control data generation unit
213 . . . remote control signal transmission unit
214 . . . video content reception unit
215, 316 . . . video image processing unit
216 . . . video image display control unit
221 . . . video content storage unit
311 . . . remote control signal reception unit
312 . . . motion control data extraction unit
313 . . . drive control unit
314 . . . video data acquisition unit
315 . . . motion detection data acquisition unit
321 . . . video data storage unit

The invention claimed is:

1. A remote control system comprising a user apparatus connected to a display unit and a remote operation apparatus configured to operate in response to a control signal transmitted from the user apparatus via a network,
the remote operation apparatus comprising:
a movable unit capable of changing a posture;
a video data acquisition unit configured to acquire video data output from a camera disposed in the movable unit;
a motion detection data acquisition unit configured to acquire, through a motion sensor, motion detection data representing a change in the posture of the movable unit; and
a data transmission unit configured to transmit the acquired video data and the acquired motion detection data to the user apparatus via the network,
the user apparatus comprising:
a data reception unit configured to receive the video data and the motion detection data transmitted from the remote operation apparatus via the network;
a determination unit configured to determine, based on the received motion detection data, a period when the posture of the movable unit is changing;
a video image processing unit configured to perform, based on a determination result of the determination unit, a process of reducing a sense of immersion with respect to the video data received during the period when the posture of the movable unit is changing; and
an output unit configured to output, to the display unit, data in which the sense of immersion has been reduced.

2. A video image processing apparatus provided in either a user apparatus connected to a display unit or a remote operation apparatus that is configured to operate in response to a control signal transmitted from the user apparatus via a network and that includes a movable unit capable of changing a posture, the video image processing apparatus comprising:
a video data acquisition unit configured to acquire video data output from a camera disposed in the movable unit;
a motion detection data acquisition unit configured to acquire, through a motion sensor, motion detection data representing a change in the posture of the movable unit;
a determination unit configured to determine, based on the acquired motion detection data, a period when the posture of the movable unit is changing;
a video image processing unit configured to perform, based on a determination result of the determination unit, a process of reducing a sense of immersion with respect to the video data acquired during the period when the posture of the movable unit is changing; and
an output unit configured to output, to the display unit, data in which the sense of immersion has been reduced.

3. The video image processing apparatus according to claim 2, wherein the video image processing unit is configured to perform, on the video data acquired during the period when the posture of the movable unit is changing, a process of stilling a video image, replacing the video data with still image data of a single color, making the video image translucent, reducing a pixel density, or reducing a frame size.

4. The video image processing apparatus according to claim 2, wherein the video image processing unit is configured to replace the video data acquired during the period when the posture of the movable unit is changing with standby image data to which information indicating that the remote operation apparatus is moving has been added.

5. A non-transitory computer-readable medium recording a program for causing a processor included in the video image processing apparatus according to claim 2 to execute processing to be performed by each of the units included in the video image processing apparatus.

* * * * *